United States Patent [19]

Chiussi et al.

[11] Patent Number: 5,701,292
[45] Date of Patent: Dec. 23, 1997

[54] METHOD AND APPARATUS FOR CONTROLLING DATA TRANSFER RATES OF DATA SOURCES IN ASYNCHRONOUS TRANSFER MODE-BASED NETWORKS

[75] Inventors: Fabio Massimo Chiussi, Tinton Falls; Vijay Pochampalli Kumar, Freehold, both of N.J.; Christos Tryfonas, Santa Cruz; Muddu Sudhakar, Los Angeles, both of Calif.

[73] Assignee: Lucent Technologies Inc., Murray Hill, N.J.

[21] Appl. No.: 567,020

[22] Filed: Dec. 4, 1995

[51] Int. Cl.$^6$ .............................. H04J 3/16; H04L 12/56
[52] U.S. Cl. .................. 370/232; 370/253; 370/395; 395/200.13
[58] Field of Search ...................... 370/229, 230, 370/231, 232, 233, 235, 236, 252, 253, 395, 396, 397; 395/200.01, 200.13

[56] References Cited

U.S. PATENT DOCUMENTS

| | | | |
|---|---|---|---|
| 5,090,011 | 2/1992 | Fukuta et al. | 370/230 |
| 5,313,454 | 5/1994 | Bustini et al. | 370/231 |
| 5,400,329 | 3/1995 | Tokura et al. | 370/232 |
| 5,442,624 | 8/1995 | Bonomi et al. | 370/231 |
| 5,457,687 | 10/1995 | Newman | 370/232 |

*Primary Examiner*—Alpus H. Hsu

[57] ABSTRACT

A method and apparatus for controlling the data transfer rates of data sources in an asynchronous transfer mode-based network utilizes maximum and minimum data transfer rates of sources in the network. A switch instructs data sources within the network to modify their data transfer rates by detecting "potential congestion" and "congested" states.

58 Claims, 2 Drawing Sheets

1

METHOD AND APPARATUS FOR CONTROLLING DATA TRANSFER RATES OF DATA SOURCES IN ASYNCHRONOUS TRANSFER MODE-BASED NETWORKS

BACKGROUND OF THE INVENTION

1. Field of the Invention

The present invention relates to a method and apparatus for controlling data transfer rates of data sources in order to provide available bit rate service in asynchronous transfer mode-based networks using the maximum and minimum data transfer rates of data sources in the network.

2. Description of Related Art

Asynchronous transfer mode ("ATM") networks are capable of handling large amounts of information or data. Such networks typically comprise a large number of data sources, each of which is capable of transmitting huge amounts of data. This data is routed to various remote destinations using one or more communication switches ("switch" or "switches"), e.g. central office switch. This type of switch has built-in control mechanisms for monitoring and controlling the amount of data being transferred from many data sources to each destination. Users of such an ATM network typically require that a certain "quality of service" (i.e., data transfer rate, cell loss, delay, etc.) be guaranteed in order to assure that their data will be transmitted effectively and economically. ATM networks typically offer different services (e.g., Constant Bit Rate (CBR), Variable Bit Rate (VBR), Available Bit Rate (ABR). The ABR service guarantees a certain loss rate only to connections to the network whose sources adjust their data transfer rate according to feedback information received from the network. In order to provide ABR service in such an ATM network it is critical that the amount of data being transferred from the many data sources be monitored and controlled by the switch in order to prevent the network from becoming overloaded, which could result in data being lost between an originating data source and its end destination. Many methods have been devised to control the data transfer rate of data sources in an ATM-based network. One such method uses an Enhanced Proportional Control Rate (EPRC). Such a method prevents overloads while monitoring the "congestion" or traffic of data between data sources and switches. In the EPRC method, data transfer rate information, which indicates congestion or potential congestion of the network, is transmitted between data sources and switches of an ATM-based network. In the EPRC method the switch calculates a mean connection rate which represents the mean value of all of the data transfer rates of all the data sources which are apart of the network. After the switch calculates this mean transfer rate it instructs specific data sources to increase or decrease their data transfer rates in order to prevent the network from overloading and shutting down.

Such an EPRC method while preventing network overload requires each switch to include expensive and complex electronics to calculate the mean connection rate. In addition, inaccuracies in calculating the mean connection rate can lead to network inefficiencies. The EPRC method also requires each data source above the mean connection rate to decrease its data transfer rate without regard to how far above the mean connection rate an individual data source may be operating.

Thus, a method and apparatus of controlling data transfer rates of data sources to provide ABR service in an ATM-based network which overcomes the limitations of existing EPRC systems and methods is desired.

SUMMARY OF THE INVENTION

It is an object of the present invention to provide a method for controlling the data transfer rate of data sources in an ATM-based network which comprises monitoring at least one first congestion indicator or queue length in a communication switch that is a part of the network; transmitting electronic code or a resource management ("RM") cell from at least the switch, which comprises data transfer rate information, to a first group of data sources each of which has a data transfer rate greater than or equal to a switch minimum data transfer rate multiplied by a first variable when the at least one, first congestion indicator equals or exceeds a first threshold otherwise known as a QT threshold; transmitting electronic code or an RM cell from at least a switch which comprises data transfer rate information to a second group of data sources each of which has a data transfer rate lower than the switch minimum data transfer rate multiplied by the first variable, when the at least one, first congestion indicator equals or exceeds the first threshold; transmitting electronic code or an RM cell from at least the switch comprising data transfer rate information to all data sources in the network, when the at least one, first congestion indicator equals or exceeds a second threshold known as a DQT threshold; and transmitting electronic code or an RM cell from at least the switch which comprises data transfer rate information to all data sources in the network, when the at least one, first congestion indicator is less than the first threshold, wherein the data transfer rate information transmitted to the first data sources is used by each one of the first data sources to reduce their data transfer rate, data transfer rate information transmitted to the second data sources is used by each one of the second data sources whose data transfer rate is less than a switch maximum data transfer rate multiplied by a second variable to increase their data transfer rate, the data transfer rate information transmitted to all the data sources is used by all of the data sources to reduce their data transfer rates when the at least one, first congestion indicator equals or exceeds the second threshold, the data transfer rate information transmitted to all of the data sources is used by all of the data sources to increase the data transfer rate of each data source whose data transfer rate is less than the switch maximum data transfer rate multiplied by the second variable when the at least one, first congestion indicator is less than the first threshold.

It is a further object of the present invention to provide an apparatus for controlling the data transfer rates of data sources in an ATM-based network, comprising at least one queue length register that generates at least one, first congestion indicator; a first data transfer rate register that indicates switch maximum and switch minimum data transfer rates; a second data transfer rate register that indicates data transfer rate information; a data source identifying register that indicates at least one data source having a data transfer rate equal to the switch maximum data transfer rate; a transmitter for transmitting electronic code comprising data transfer rate information to data sources; and a controller for monitoring the at least one, first congestion indicator, switch maximum and minimum data transfer rates, and the data source identifier, for updating the switch maximum and minimum data transfer rates and data source identifier and for controlling the transmitter to transmit electronic code comprising data transfer rate information to, first data sources each having a data transfer rate greater than or equal to the switch minimum data transfer rate multiplied by a first variable and to second data sources each having a data transfer rate lower than the switch minimum data transfer rate multiplied by the first variable when the at least one, first congestion indicator equals or exceeds a first threshold, to all data sources when the at least one, first congestion indicator equals or exceeds a second threshold, and to all data sources when the at least one, first congestion indicator is less than the first threshold, wherein the data transfer rate information transmitted to the first data sources is used by each one of the first data sources to reduce their data transfer rate, the data transfer rate information transmitted to the second data sources is used by each one of the second data sources whose data transfer rate is less than a switch maximum data transfer rate multiplied by a second variable to increase their data transfer rate, data transfer rate information transmitted to all the data sources is used by all the data sources to reduce their data transfer rates when the at least one, first congestion indicator equals or exceeds the second threshold and data transfer rate information transmitted to all the data sources is used by all the data sources to increase the data transfer rate of each data source whose data transfer rate is less than the switch maximum data transfer rate multiplied by the second variable when the at least one, first congestion indicator is less than the first threshold.

BRIEF DESCRIPTION OF THE DRAWINGS

The invention is described in relation to the accompanying drawings in which.

DETAILED DESCRIPTION OF PREFERRED EMBODIMENTS

Figure 1:
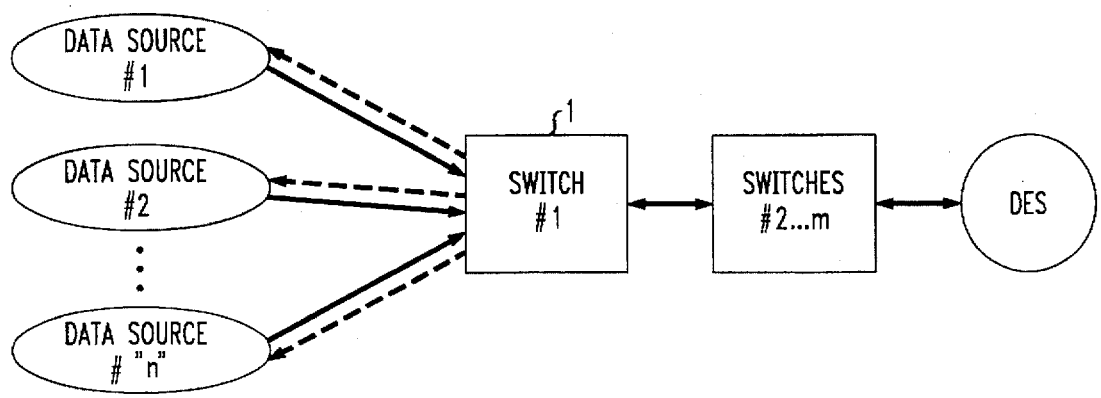
FIG. 1 depicts a number of data sources connected to a switch in an ATM-based network.

Referring to FIG. 1 there is shown a generalized ATM-based network. In this network a number of data sources 1, 2 ... n will be connected to a switch 1. The switch 1 may in turn be connected to switches 2 ... m. Eventually the data from data sources 1,2 ... n are transferred to a destination, "DES". Any switch (from 1 to m) in the network may be used to control the data transfer rates of the data sources 1,2 ... n connected to switch 1 in order to prevent overload of the network.

To prevent overload, switch 1 (or for that matter, any switch 1 ... m) must adjust the data transfer rates of the data sources 1,2 ... n. To achieve this each data source 1,2 ... n periodically sends an electronic code or RM cell to the switch 1. Subsequently, the switch 1 will return an electronic code or RM cell to each data source. The RM cell, among other things, contains information regarding the data transfer rate of each data source. Such an RM cell may be that specified by industry standards, such as those promulgated by the ATM Forum. When an RM cell is sent by a data source 1,2 ... n to the switch 1 the RM cell contains data transfer rate information regarding the data transfer or bit rate of the data source. When an RM cell is sent by the switch 1 to a data source 1,2 ... n, the RM cell contains data transfer rate information which instructs the data source to either increase or decrease its data transfer rate by a specific amount or instructs the data source to operate at a specific data transfer rate.

Though the above description involves the use of only one switch, switch 1, it should be understood that any number of switches may be involved. For example, when multiple switches are involved an RM cell sent by a data source may travel through each of the switches until it reaches a destination (or intermediate switch). The RM cell then returns to its originating data source. During the path from data source to destination, back to data source, any switch along the path may place data transfer rate information in the RM cell. This allows each switch in the network to control the data transfer rate of all sources which transmit RM cells through such a switch, even if the data sources are physically connected to a different switch.

Hereafter, therefore, when reference is made to a single switch, switch 1, it should be understood that any switch in the network, not just the switch which is physically connected to the data sources, may control the data transfer rates of the data sources in the network.

Figure 2:
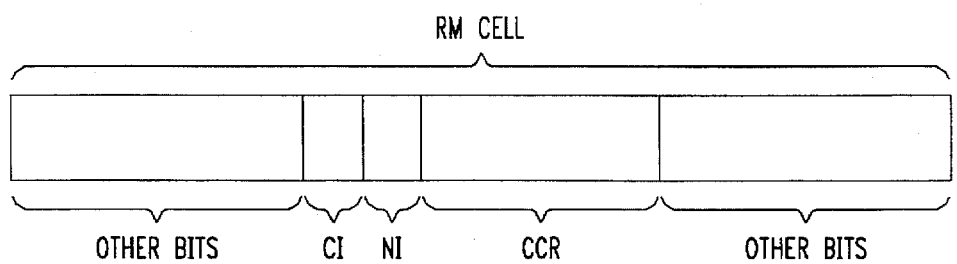
FIG. 2 depicts a generalized RM cell which is transmitted between data sources and switches of an ATM-based network according to an embodiment of the present invention.

Referring now to FIG. 2 there is shown a generalized RM cell. When the switch 1 sends an RM cell to a data source 1,2 ... n, the RM cell may comprise a congestion indication (CI) bit, "no increase" (NI) bit and a current cell rate (CCR) field or bits.

In an embodiment of the invention, when the switch 1 has detected a "congested" state then the switch will set the CI bit to a binary "1" or "0". By setting the CI bit and then transmitting the RM cell to a data source 1,2 ... n the switch 1 instructs the data source to decrease its data transfer rate. Likewise, the switch 1 may set the NI bit. By setting the NI bit the switch 1 may instruct a data source to increase its data transfer rate or to maintain its present data transfer rate.

The CCR field is typically used by a data source 1,2 ... n to communicate its data transfer rate to the switch 1. An "explicit rate field" ("ER") may also be used by the switch 1 to set the data transfer rates of data sources 1,2 ... n.

Each data source 1,2 ... n of FIG. 1 also transmits an identifier or address to the switch 1 which identifies it from every other data source in the network.

Figure 3:
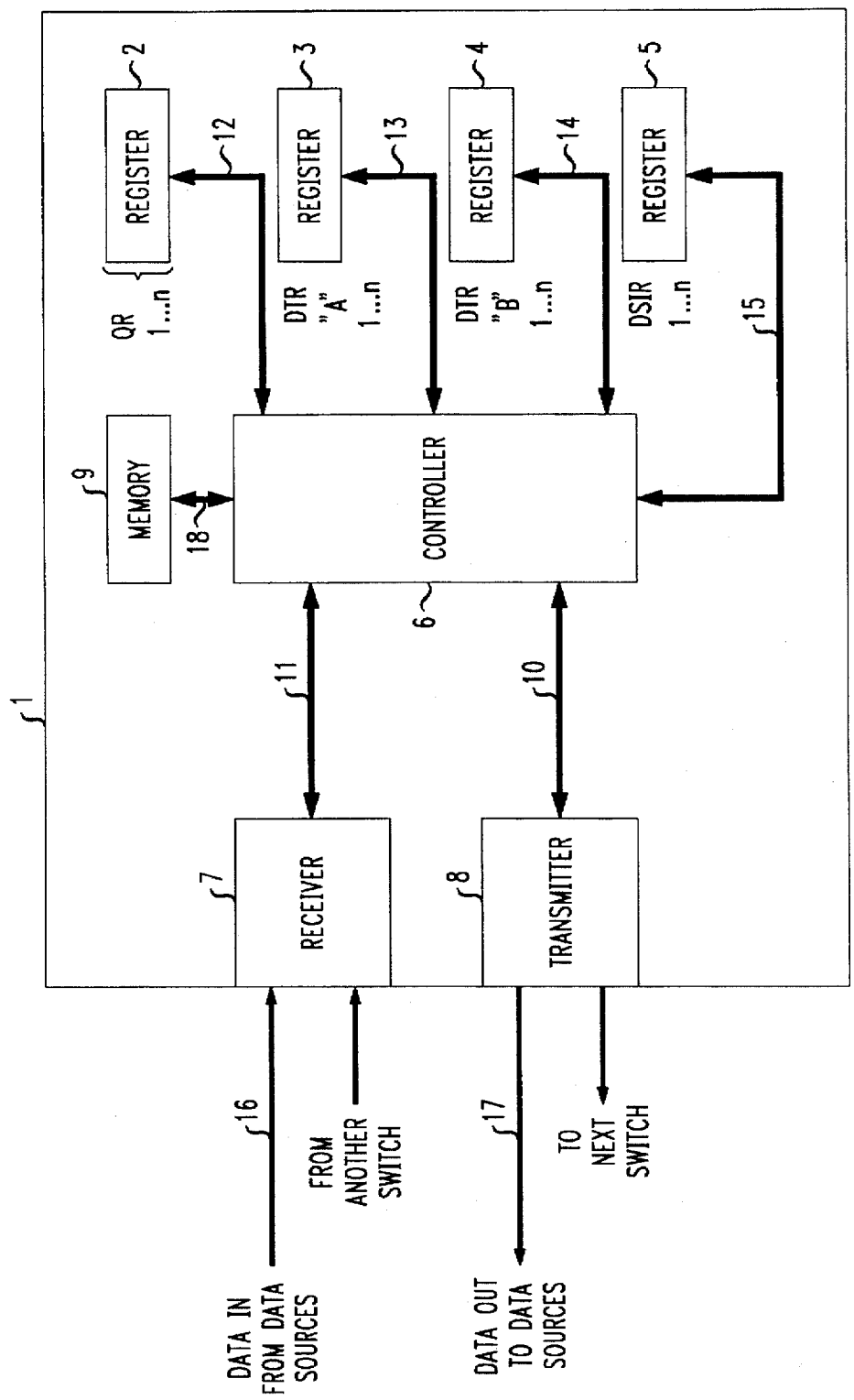
FIG. 3 is a block diagram of an apparatus according to one embodiment of the present invention for controlling the data transfer rates of data sources in an ATM-based network.

FIG. 3 depicts a block diagram of an apparatus or switch 1 according to one embodiment of the present invention. As shown, the switch 1 comprises at least one queue length register 2 (QR) that generates at least one, first congestion indicator or queue length, a first data transfer register 3 (DTR A) that indicates both switch maximum and switch minimum data transfer rates, a second data transfer rate register 4 (DTR B) that indicates data transfer rate information and a data source identifying register 5 (DSiR) that indicates and identifies at least one data source which has a data transfer rate equal to the switch maximum data transfer rate. As is indicated in FIG. 3, each of the registers may comprise a number of registers 1,2 ... n. The switch 1 also comprises a transmitter 8 for transmitting electronic code or RM cells to data sources or to other switches. The electronic code comprises data transfer rate information, e.g. CI, NI, CCR bits etc....

The switch 1 also contains memory 9 for storing reference information such as thresholds, variables or specific data transfer rates.

A preferred embodiment of the operation of the switch 1 depicted in FIG. 3 will now be explained. A controller 6 monitors the at least one, first congestion indicator held by the queue length register 2. When the first congestion indicator equals or exceeds a first threshold (known as "QT") the controller 6 controls and instructs the transmitter 8 to transmit electronic code or an RM cell to a first group of data sources which have a data transfer rate greater than or equal to the switch minimum data transfer rate multiplied by a first variable. The controller 6 further instructs or controls the transmitter 8 to transmit electronic code to a second group of data sources each of which has a data transfer rate lower than the switch minimum data transfer rate multiplied by the first variable. Upon receiving the data transfer rate information from the switch 1 the first data sources are instructed to reduce their data transfer rate, and each of the second data sources are instructed to increase their data transfer rate, provided, however, that no one of the second data sources can increase its rate unless its data transfer rate is less than the switch maximum data transfer rate multiplied by a second variable.

As will be recognized by those skilled in the art, the first variable may be an increase pressure factor, a fraction or equal to 1. In this manner, the switch minimum data transfer rate may be set at various levels according to specific network design parameters. Similarly, the first variable may depend on a certain queue length value or on a second congestion indicator or indicators. Likewise the second variable may be equal to a fraction, may equal 1, may depend on a queue length value or may depend on a third congestion indicator or indicators.

Returning to the operation of the switch 1, the controller 6 continues to monitor the first congestion indicator in the queue length register 2. If this first congestion indicator equals or exceeds a second threshold (or DQT threshold) than the controller 6 instructs the transmitter to send data transfer rate information or an RM cell to each one of the data sources in the network. Upon receiving the RM cell, all data sources are instructed to reduce their data transfer rates.

If in the event the controller 6 determines, by monitoring the first congestion indicator, that the first congestion indicator has not equalled or exceeded the first threshold, then the controller 6 instructs or controls the transmitter 8 to transmit data transfer rate information to all of the data sources whereupon each one of the data sources is instructed to increase its data transfer rate. However, no data source, whose data transfer rate equals or exceeds the switch maximum data transfer rate multiplied by the second variable, will be allowed to increase its data transfer rate.

According to one embodiment of the present invention, when the first congestion indicator reaches the first threshold, QT, the switch 1 is considered "congested."

The increase pressure factor may be used as the first variable to avoid reducing the data transfer rate of sources whose data transfer rate is very close to the switch minimum data transfer rate. An increase pressure factor of ⅝ may be used in one embodiment of the present invention.

Optionally, the controller 6 may instruct the transmitter 8 to transmit an RM cell to all of the data sources in the network when the switch maximum data transfer rate stored in register 3 is close to the switch minimum data transfer rate also stored in register 3, provided the first congestion indicator equals or exceeds a third threshold. Once all of the data sources have received a RM cell each of the data sources is instructed to reduce its data transfer rate. The third threshold may be set to equal the first threshold both of which may be stored in memory 9.

A receiver 7 periodically receives an RM cell or electronic code from a number of data sources. The receiver 7 then forwards this information to the controller 6 which then updates the switch maximum and switch minimum data transfer rates stored in register 3 as well as updating the data source identifier stored in register 5. The receiver 7 may comprise circuitry for receiving, storing, transmitting data transfer rate information to the controller 6 or it may compose just receiving circuitry. The data source identifier stored in register 5 identifies the data source (or sources) having the maximum data transfer rate. The switch maximum and minimum data transfer rates stored in register 3 are calculated by the controller 6 using all of the data transfer rates of all of the data sources in the network.

Optionally, the switch minimum and maximum data transfer rates and the data source identifier may be updated some time after the switch fails to receive an RM cell from at least one data source or a group of data sources, or the switch minimum and switch maximum data transfer rates and the data source identifier may be updated without regards to an RM cell received from the at least one data source or sources.

A second embodiment of the present invention provides enhanced congestion indication and control of data sources in an ATM-based network. The controller 6 may control the transmitter to transmit an RM cell to a third group of data sources each of which have a data transfer rate greater than or equal to the switch maximum data transfer rate multiplied by a third variable when the first congestion indicator increases by a fixed amount in a fixed period of time. In this manner even though the congestion indicator has not equalled or exceeded the first, or QT, threshold the controller 6 can instruct the transmitter 8 to transmit an RM cell to the third data sources to reduce their data transfer rates. In this manner the switch 1 is capable of detecting a potential congested state. The fixed amount may be referred to as an RQL. The value of RQL may also be stored in memory 9 along with the time corresponding to the fixed period of time. Suitable circuitry may be provided (not shown in FIG. 3) to monitor the time corresponding to such a "fixed period of time."

As with the first and second variables, the third variable may equal a down pressure factor, a fraction of the number one, the number 1, or may depend on the value of a queue length, or on a fourth congestion indicator.

Optionally, the congestion indicator stored in register 2 may comprise more than one congestion indicator.

A third embodiment of the present invention is also useful in detecting potential congestion. In this embodiment, the controller 6 instructs the transmitter 8 to transmit an RM cell to a fourth group of data sources each of which has a data transfer rate greater than or equal to the switch maximum data transfer rate multiplied by a fourth variable. The transmitter is instructed to do so only after the controller 6 has determined that a total incoming data transfer rate of at least one link 16 exceeds a total outgoing data transfer rate capacity of links 16 or 17. If such a state is detected by the controller 6 then the RM cell sent to the fourth data sources is used by each one of the fourth data sources to reduce their data transfer rate.

The controller 6 communicates its instructions to the transmitter 8 over data/control bus 10. Similarly, the controller 6 fetches data stored in registers 2, 3, 4, 5 and memory 9 using data/control buses 12, 13, 14, 15 and 18. The receiver 7 may receive instructions from the controller 6 and send data to the controller 6 over data/control bus 11. The switch 1 may transmit data transfer information or other information to other switches in the network over link 17.

The above described embodiments are but some examples of the novel method and apparatus which may be used in detecting congestion or potential congestion of an ATM-based network. Modifications to the above-described preferred embodiments may occur to those skilled in the art without departing from the spirit and scope of the present invention as defined in the appended claims.

What is claimed is:

1. A method for controlling data transfer rates of data sources in an asynchronous transfer mode-based network comprising:

monitoring at least one first congestion indicator in a communications switch that is a part of the network;

transmitting electronic code, from at least the switch, comprising data transfer rate information to first data sources each having a data transfer rate greater than or equal to a switch minimum data transfer rate multiplied by a first variable when the at least one first congestion indicator equals or exceeds a first threshold;

transmitting electronic code, from at least the switch, comprising data transfer rate information to second data sources each having a data transfer rate lower than the switch minimum data transfer rate multiplied by the first variable when the at least one first congestion indicator equals or exceeds the first threshold;

transmitting electronic code, from at least the switch, comprising data transfer rate information to all data sources when the at least one first congestion indicator equals or exceeds a second threshold; and transmitting electronic code, from at least the switch, comprising data transfer rate information to all data sources when the at least one first congestion indicator is less than the first threshold, wherein the data transfer rate information transmitted to the first data sources is used by each one of the first data sources to reduce their data transfer rate, the data transfer rate information transmitted to the second data sources is used by each one of the second data sources whose data transfer rate is less than a switch maximum data transfer rate multiplied by a second variable to increase their data transfer rate, the data transfer rate information transmitted to all of the data sources is used by all of the data sources to reduce their data transfer rates when the at least one first congestion indicator equals or exceeds the second threshold, and the data transfer rate information transmitted to all of the data sources is used by all of the data sources to increase the data transfer rate of each data source whose data transfer rate is less than the switch maximum data transfer rate multiplied by the second variable when the at least one first congestion indicator is less than the first threshold.

2. The method as in claim 1, further comprising transmitting electronic code, from at least the switch, comprising data transfer rate information to all data sources when the switch maximum data transfer rate is close to the switch minimum data transfer rate and when the at least one first congestion indicator equals or exceeds a third threshold, wherein the data transfer rate information is used by all the data sources to reduce their data transfer rates.

3. The method as in claim 2, wherein the switch minimum and switch maximum data transfer rates, and at least one data source identifier that identifies at least one data source having a data transfer rate equal to the switch maximum data transfer rate, may be updated some time after the switch receives electronic code comprising data transfer rate information from at least one data source.

4. The method as in claim 1, further comprising transmitting electronic code, from at least the switch, comprising data transfer rate information to third data sources each having a data transfer rate greater than or equal to the switch maximum data transfer rate multiplied by a third variable when the at least one congestion indicator increases by a fixed amount in a fixed period of time, wherein the data transfer rate information transmitted to the third data sources is used by each one of the third data sources to reduce their data transfer rate.

5. The method as in claim 4, wherein more than one first congestion indicators are monitored and compared to the first and second thresholds.

6. The method as in claim 2, further comprising transmitting electronic code, from at least the switch, comprising data transfer rate information to third data sources each having a data transfer rate greater than or equal to the switch maximum data transfer rate multiplied by a third variable when the at least one first congestion indicator exceeds a fourth threshold, wherein the data transfer rate information transmitted to the third data sources is used by each one of the third data sources to reduce their data transfer rate.

7. The method as in claim 6, further comprising transmitting electronic code, from at least the switch, comprising data transfer rate information to fourth data sources each having a data transfer rate greater than or equal to the switch maximum data transfer rate multiplied by a fourth variable when a total incoming data transfer rate of at least one link of the switch exceeds a total outgoing data transfer rate capacity of the at least one link of the switch, wherein the data transfer rate information transmitted to the fourth data sources is used by each one of the fourth data sources to reduce their data transfer rate.

8. The method as in claim 1, wherein the first variable is an increase pressure factor.

9. The method as in claim 1, wherein the first variable is a fraction of the number one.

10. The method as in claim 1, wherein the first variable equals one.

11. The method as in claim 1, wherein the first variable depends on a value of a queue length.

12. The method in claim 1, wherein the first variable depends on at least one second congestion indicator.

13. The method as in claim 1, wherein the second variable is a fraction of the number one.

14. The method as in claim 1, wherein the second variable equals one.

15. The method as in claim 1, wherein the second variable depends on a value of a queue length.

16. The method as in claim 12, wherein the second variable depends on at least one third congestion indicator.

17. The method as in claim 2, wherein the third threshold is equal to the first threshold.

18. The method as in claim 3, wherein the switch minimum and maximum data transfer rates and the at least one data source identifier may be updated sometime after the switch fails to receive electronic code comprising data transfer rate information from at least the one data source.

19. The method as in claim 3, wherein updating the switch minimum and maximum data transfer rates and the at least one data source identifier is not dependent upon the electronic code comprising data transfer rate information received from the at least one data source.

20. The method as in claim 4, wherein the third variable is a down pressure factor.

21. The method as in claim 4, wherein the third variable is a fraction of the number one.

22. The method as in claim 4, wherein the third variable equals one.

23. The method as in claim 4 wherein the third variable depends on a value of a queue length.

24. The method as in claim 16 wherein the third variable depends on at least one fourth congestion indicator.

25. The method as in claim 7, wherein the fourth variable is a down pressure factor.

26. The method as in claim 7, wherein the fourth variable is a fraction of the number one.

27. The method as in claim 7, wherein the fourth variable equals one.

28. The method as in claim 7, wherein the fourth variable depends on a value of a queue length.

29. The method as in claim 24, wherein the fourth variable depends on at least a fifth congestion indicator.

30. An apparatus for controlling data transfer rates of data sources in an asynchronous transfer mode-based network, comprising:

at least one queue length register that generates at least one first congestion indicator;

a first data transfer rate register that indicates switch maximum and switch minimum data transfer rates;

a second data transfer rate register that indicates data transfer rate information;

a data source identifying register that indicates at least one data source having a data transfer rate equal to the switch maximum data transfer rate;

a transmitter for transmitting electronic code comprising data transfer rate information to the data sources; and a controller for monitoring the at least one first congestion indicator, switch maximum and minimum data transfer rates, and the data source identifier, for updating the switch maximum and minimum data transfer rates and data source identifier and for controlling the transmitter to transmit electronic code comprising data transfer rate information to, first data sources each having a data transfer rate greater than or equal to the switch minimum data transfer rate multiplied by a first variable and to second data sources each having a data transfer rate lower than the switch minimum data transfer rate multiplied by the first variable when the at least one congestion indicator equals or exceeds a first threshold, to all data sources when the at least one first congestion indicator equals or exceeds a second threshold, and to all data sources when the at least one first congestion indicator is less than the first threshold, wherein the data transfer rate information transmitted to the first data sources is used by each one of the first data sources to reduce their data transfer rate, the data transfer rate information transmitted to the second data sources is used by each one of the second data sources whose data transfer rate is less than the switch maximum data transfer rate multiplied by a second variable to increase their data transfer rate, the data transfer rate information transmitted to all of the data sources is used by all of the data sources to reduce their data transfer rates when the at least one first congestion indicator equals or exceeds the second threshold, and the data transfer rate information transmitted to all of the data sources is used by all of the data sources to increase the data transfer rate of each data source whose data transfer rate is less than the switch maximum data transfer rate multiplied by the second variable when the at least one first congestion indicator is less than the first threshold.

31. The apparatus as in claim 30, wherein the controller further controls the transmitter to transmit electronic code comprising data transfer rate information to all of the data sources when the switch maximum data transfer rate is close to the switch minimum data transfer rate and when the at least one first congestion indicator equals or exceeds a third threshold, wherein the data transfer rate information transmitted to all of the data sources is used by all of the data sources to reduce their data transfer rates.

32. The apparatus as in claim 30, further comprising a receiver for receiving electronic code comprising data transfer rate information from at least one data source, the controller updating the switch maximum and switch minimum data transfer rates and data source identifier sometime after the receiver receives electronic code from the at least one data source.

33. The apparatus as in claim 30, wherein the controller further controls the transmitter to transmit electronic code comprising data transfer rate information to third data sources each having a data transfer rate greater than or equal to the switch maximum data transfer rate multiplied by a third variable when the at least one first congestion indicator increases by a fixed amount in a fixed period of time, wherein the data transfer rate information transmitted to the third data sources is used by each one of the third data sources to reduce their data transfer rates.

34. The apparatus as in claim 33, further comprising more than one queue length register, each register generating at least one congestion indicator, wherein more than one congestion indicator is compared to the first and second thresholds.

35. The apparatus as in claim 31, wherein the controller further controls the transmitter to transmit electronic code comprising data transfer rate information to third data sources each having a data transfer rate greater than or equal to the switch maximum transfer rate multiplied by a third variable when the at least one congestion indicator exceeds a fourth threshold.

36. The apparatus as in claim 35, wherein the controller further controls the transmitter to transmit data transfer rate information to fourth data sources each having a data transfer rate greater than or equal to the switch maximum data transfer rate multiplied by a fourth variable when a total incoming data transfer rate of at least one link connection exceeds a total outgoing data transfer rate capacity of the at least one link connection, wherein the data transfer rate information transmitted to the fourth data sources is used by each one of the fourth data sources to reduce their data transfer rate.

37. The apparatus as in claim 30, wherein the first variable is an increase pressure factor.

38. The apparatus as in claim 30, wherein the first variable is a fraction of the number one.

39. The apparatus as in claim 30, wherein the first variable equals one.

40. The apparatus as in claim 30, wherein the first variable depends on a value of a queue length.

41. The apparatus as in claim 30, wherein the first variable depends on at least one second congestion indicator.

42. The apparatus as in claim 30, wherein the second variable is a fraction of the number one.

43. The apparatus as in claim 30, wherein the second variable equals one.

44. The method as in claim 30, wherein the second variable depends on a value of a queue length.

45. The method as in claim 41, wherein the second variable depends on at least one third congestion indicator.

46. The apparatus as in claim 31, wherein the third threshold is equal to the first threshold.

47. The apparatus as in claim 32, wherein the switch minimum and maximum data transfer rates and the at least one data source identifier may be updated some time after the switch fails to receive electronic code comprising data transfer rate information from at least the one data source.

48. The apparatus as in claim 32, wherein updating the switch minimum and maximum data transfer rates and the at least one data source identifier is not dependent upon the electronic code comprising data transfer rate information received from the at least one data source.

49. The apparatus as in claim 33, wherein the third variable is a down pressure factor.

50. The apparatus as in claim 33, wherein the third variable is a fraction of the number one.

51. The apparatus as in claim 33, wherein the third variable equals one.

52. The apparatus as in claim 33, wherein the third variable depends on a value of queue length.

53. The apparatus as in claim 45, wherein the third variable depends on at least one fourth congestion indicator.

54. The apparatus as in claim 36, wherein the fourth variable is a down pressure factor.

55. The apparatus as in claim 36, wherein the fourth variable is a fraction of the number one.

56. The apparatus as in claim 36, wherein the fourth variable equals one.

57. The apparatus as in claim 36, wherein the fourth variable depends on a value of a queue length.

58. The apparatus as in claim 53, wherein the fourth variable depends on at least one fifth congestion indicator.

* * * * *